US008762339B2

(12) United States Patent
Bartholomy et al.

(10) Patent No.: US 8,762,339 B2
(45) Date of Patent: Jun. 24, 2014

(54) DISASTER RECOVERY UTILIZING COLLAPSIBLE VIRTUALIZED CAPACITY

(75) Inventors: Erik Bartholomy, Longmont, CO (US); Frank J. Giordano, Richlands, NC (US); Gordan G. Greenlee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/955,483

(22) Filed: Nov. 29, 2010

(65) Prior Publication Data

US 2012/0136833 A1 May 31, 2012

(51) Int. Cl.
*G06F 17/30* (2006.01)

(52) U.S. Cl.
USPC ............... 707/640; 707/644; 707/674; 714/2; 714/13

(58) Field of Classification Search
None
See application file for complete search history.

(56) References Cited

U.S. PATENT DOCUMENTS

| | | | |
|---|---|---|---|
| 7,191,327 B2 | 3/2007 | Viljoen et al. | |
| 7,296,182 B2* | 11/2007 | Greenspan et al. | ............. 714/13 |
| 7,379,990 B2 | 5/2008 | Tsao | |
| 7,509,535 B1 | 3/2009 | Gulve et al. | |
| 7,711,983 B2 | 5/2010 | Hatasaki et al. | |
| 2007/0078982 A1* | 4/2007 | Aidun et al. | .................. 709/225 |
| 2008/0313242 A1* | 12/2008 | Doerr | ........................... 707/202 |
| 2009/0119536 A1 | 5/2009 | Guo et al. | |
| 2009/0271658 A1 | 10/2009 | Aidun | |
| 2009/0313311 A1 | 12/2009 | Hoffmann et al. | |
| 2012/0136833 A1 | 5/2012 | Bartholomy et al. | |
| 2012/0159235 A1 | 6/2012 | Suganthi et al. | |
| 2012/0240226 A1 | 9/2012 | Li | |

FOREIGN PATENT DOCUMENTS

| | | |
|---|---|---|
| CN | 101330643 A | 12/2008 |
| CN | 101924988 A | 12/2010 |

OTHER PUBLICATIONS

Wood et al., "Disaster Recovery as a Cloud Service: Economic Benefits & Deployment Challenges," May 2010, pp. 1-7, University of Massachusetts, retrieved from: http://www.usenix.org/event/hotcloud10/tech/full_papers/Wood.pdf.

Kahane et al., "Computer Backup Pools, Disaster Recovery, and Default Risk," Jan. 1988, pp. 78-83, Communications of the ACM, vol. 31, No. 1.

Maffei et al., "Remote Dual Copy: Hot Backup Site Now a Reality, But, at What Cost,"Dec. 1997, 1 page (Abstract), The 1997 23rd International Conference for the Resource Management & Performance Evaluation of Enterprise Computing Systems, Part 2 (of 2), CSA Technology Research Database.

(Continued)

*Primary Examiner* — Sherief Badawi
*Assistant Examiner* — David T Brooks
(74) *Attorney, Agent, or Firm* — Lisa Ulrich; Hoffman Warnick LLC (57) ABSTRACT

Aspects of the present invention provide a solution for implementing disaster recovery for an application. A subscription backup site for the application is selected from among a plurality of sites. The site that is selected will have a virtual space that is able to accommodate the workload requirements for the application. The application is deflated on the site in such a way as to operate in a dormant state. In the dormant state, the application has a small fraction of its required resources allocated to it. Thereafter, when disaster recovery is needed, the application can be inflated on the subscription backup site by allocating resources to enable the application to execute on the subscription backup site.

21 Claims, 5 Drawing Sheets

(56) References Cited

OTHER PUBLICATIONS

Synergistic Online Solutions, Disaster Recovery, SynergisticHotSite, retrieved from: http://www.synergisticonline.com/dr.html#hotsite, 3 pages.

Volz et al., "The Dynamic Host Configuration Protocol (DHCP) Client Fully Qualified Domain Name (FQDN) Option (RFC4702)," Oct. 2006, 19 pages, Internet Society Requests for Comment (RFCs), IPCOM000142378D.

Chen et al., "The Challenge and Solutions of NAT Traversal for Ubiquitous and Pervasive Applications on the Internet," 2009, pp. 1620-1626, The Journal of Systems and Software, vol. 82.

International application No. PCT/CN2013/084936, International Search Report and Written Opinion, dated Jan. 16, 2014, 12 pages.

* cited by examiner

DISASTER RECOVERY UTILIZING COLLAPSIBLE VIRTUALIZED CAPACITY

TECHNICAL FIELD

The subject matter of this invention relates generally to computer application hosting. More specifically, aspects of the present invention provide a solution for implementing disaster recovery for an application.

BACKGROUND

Computer applications are pieces of computer software that help a user thereof perform a task or a number of related tasks. In the electronic environment of today, these applications are often provided in such a way as to be accessible to a number of users. To accomplish this, a provider of the application may host the application from a particular location that is accessible via a network, such as a local area network or wide area network, such as the Internet.

In hosting the application, the provider usually hopes to attain a state in which the application is available to users in a continuous manner. However, sometimes problems arise that may cause availability to be interrupted. For example, a catastrophic disaster, such as an earthquake, fire, etc., could occur at the primary host site. In the alternative, the machine or machines may experience hardware and/or software malfunctions that cause the application to cease performing. Alternatively, communications between the host and the network may be lost, resulting in an inability of users to access the application. When these events occur, providers often perform disaster recovery to restore application functionality to users.

Currently, providers can prepare for disaster recovery in one of three ways. In the first, the application is stored on a low cost backup medium. In this state, the application merely exists as a collection of data, without a host and without resources for executing the application having been allocated to the application. As such, restoring the application to functionality may be time-intensive as a host is located and resources are allocated.

In the other two scenarios, the application is given a host and the resources required to run the application are allocated to the application. The application itself may be fully functional, or may be dormant, but ready to become functional when needed. These two solutions result in faster recovery time than the lower cost backup solution. However, the allocated resources for each of these solutions are either not utilized (dormant solution) or are utilized, but not for productive use by users (fully functional backup solution) during normal, non-disaster recovery periods of operation. Because the majority of the disaster recovery operation will exist during normal operation, resources must be fully allocated or reserved even though these solutions will not be productively utilized the majority of the time. As such, each of these solutions ties up resources that could be utilized by other applications that are being fully utilized, costing resources and money.

SUMMARY

In general, aspects of the present invention provide a solution for implementing disaster recovery for an application. A subscription backup site for the application is selected from among a plurality of sites. The site that is selected will have a virtual space that is able to accommodate the workload requirements for the application. The application is deflated on the site in such as way as to operate in a dormant state. In the dormant state, the application has a small fraction of its required resources allocated to it. Thereafter, when disaster recovery is needed, the application can be inflated on the subscription backup site by allocating resources to enable the application to execute on the subscription backup site.

A first aspect of the invention provides a method for implementing disaster recovery for an application, comprising: selecting a subscription backup site for the application from a plurality of sites, the subscription backup site having a virtual space that is able to accommodate the workload requirements for the application; deflating the application to operate in a dormant state having a small fraction of resources allocated with respect to the workload requirements for the application; and in response to a disaster on a primary site of the application, inflating the application on the subscription backup site by allocating resources to enable the application to execute on the subscription backup site.

A second aspect of the invention provides a system for implementing disaster recovery for an application, comprising: a backup site selection component that selects a subscription backup site for the application from a plurality of sites, the subscription backup site having a virtual space that is able to accommodate the workload requirements for the application; a backup application deflation component that deflates the application to operate in a dormant state having a small fraction of resources allocated with respect to the workload requirements for the application; and a backup application reinflation component that inflates the application on the subscription backup site by allocating resources to enable the application to execute on the subscription backup site in response to a disaster on a primary site of the application.

A third aspect of the invention provides a computer program product embodied in a computer readable medium for implementing a method for implementing disaster recovery for an application, the method comprising: selecting a subscription backup site for the application from a plurality of sites, the subscription backup site having a virtual space that is able to accommodate the workload requirements for the application; deflating the application to operate in a dormant state having a small fraction of resources allocated with respect to the workload requirements for the application; and in response to a disaster on a primary site of the application, inflating the application on the subscription backup site by allocating resources to enable the application to execute on the subscription backup site.

A fourth aspect of the present invention provides a method for deploying an application for implementing disaster recovery for an application, comprising, providing a computer system operable to: select a subscription backup site for the application from a plurality of sites, the subscription backup site having a virtual space that is able to accommodate the workload requirements for the application; deflate the application to operate in a dormant state having a small fraction of resources allocated with respect to the workload requirements for the application; and in response to a disaster on a primary site of the application, inflate the application on the subscription backup site by allocating resources to enable the application to execute on the subscription backup site.

Still yet, any of the components of the present invention could be deployed, managed, serviced, etc., by a service provider who offers to for implement disaster recovery for an application.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, aspects of the present invention provide a solution for implementing disaster recovery for an application. A subscription backup site for the application is selected from among a plurality of sites. The site that is selected will have a virtual space that is able to accommodate the workload requirements for the application. The application is then deflated on the site in such as way as to operate in a dormant state. In the dormant state, the application has a small fraction of its required resources allocated to it. Thereafter, when disaster recovery is needed, the application is inflated on the subscription backup site by allocating resources to enable the application to execute on the subscription backup site.

Figure 1:
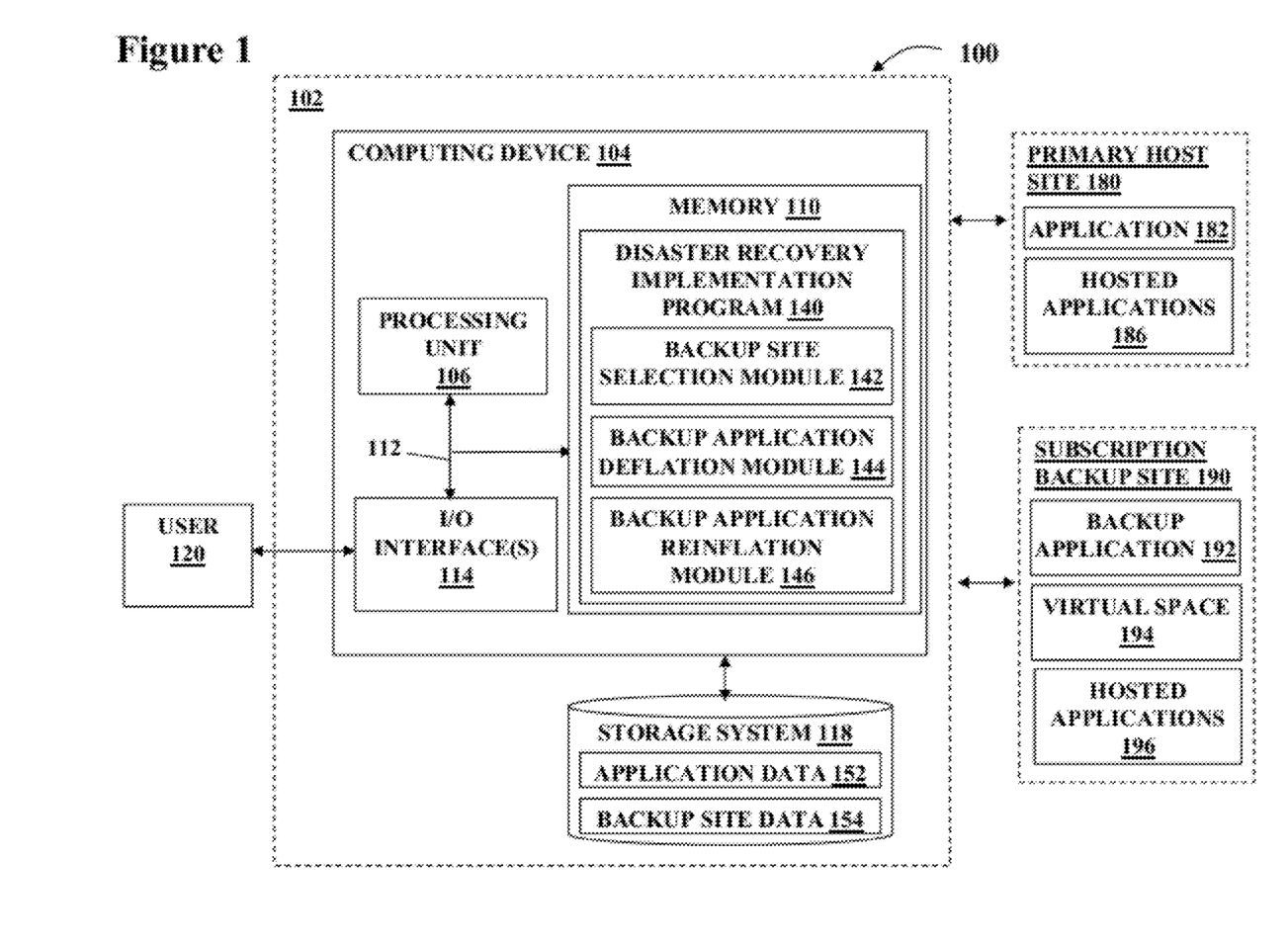
FIG. 1 shows a data processing system suitable for implementing an embodiment of the present invention.

Turning to the drawings, FIG. 1 shows an illustrative environment 100 for implementing disaster recovery for an application 182. To this extent, environment 100 includes a computer system 102 that can perform a process described herein in order to implement disaster recovery for an application 182. In particular, computer system 102 is shown including a computing device 104 that includes a disaster recovery implementation program 140, which makes computing device 104 operable to implement disaster recovery for an application 182 by performing a process described herein.

Computing device 104 is shown including a processing unit 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing unit 106 executes program code, such as disaster recovery implementation program 140, which is at least partially fixed in memory 110. To this extent, processing unit 106 may comprise a single processing unit, or be distributed across one or more processing units in one or more locations, e.g., on a client and server and/or on primary host site 180 and or subscription backup site 190.

Memory 110 can also include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of data storage and/or transmission media, including magnetic media, optical media, random access memory (RAM), read-only memory (ROM), a data cache, a data object, etc. Moreover, similar to processing unit 116, memory 110 may reside at a single physical location, comprising one or more types of data storage, or be distributed across a plurality of physical systems in various forms, included, but not limited to primary host site 180 and or subscription backup site 190.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O interface component 114 can comprise one or more human I/O devices, which enable a human user 120 to interact with computer system 102 and/or one or more communications devices to enable a system user 120 to communicate with computer system 102 using any type of communications link.

To this extent, disaster recovery implementation program 140 can manage a set of interfaces (e.g., graphical user interface(s), application program interface, and/or the like) that enable human and/or system users 120 to interact with disaster recovery implementation program 140. Users 120 could include application providers, capacity planners and/or members of one or more teams of disaster recovery experts, among others. Further, disaster recovery implementation program 140 can manage (e.g., store, retrieve, create, manipulate, organize, present, etc.) the data, such as application data 152, which indicates operational characteristics of the application, and/or backup site data 154, using any solution.

In any event, computer system 102 can comprise one or more general purpose computing articles of manufacture 104 (e.g., computing devices) capable of executing program code, such as disaster recovery implementation program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, disaster recovery implementation program 140 can be embodied as any combination of system software and/or application software. In any event, the technical effect of computer system 102 is to provide processing instructions to computing device 104 in order to implement disaster recovery for an application.

Further, disaster recovery implementation program 140 can be implemented using a set of modules 142-146. In this case, a module 142-146 can enable computer system 102 to perform a set of tasks used by disaster recovery implementation program 140, and can be separately developed and/or implemented apart from other portions of disaster recovery implementation program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of disaster recovery implementation program 140 fixed thereon (e.g., one or more modules 142-146). However, it is understood that computer system 102 and disaster recovery implementation program 140 are only representative of various possible equivalent computer systems that may perform a process described herein, including, but not limited to a primary host site 180 and/or a subscription backup site 190. To this extent, in other embodiments, the functionality provided by computer system 102 and disaster recovery implementation program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, disaster recovery implementation program 140 enables computer system 102 to implement disaster recovery for an application 182. To this extent, disaster recovery implementation program 140 is shown including a backup site selection module 142, a backup application deflation module 144, and a backup application reinflation module 146.

Referring again to FIG. 1 backup site selection module 142, as executed by computer system 102, selects a subscription backup site 190 for application 182. This subscription backup site 190 can be selected from the plurality of possible sites.

Figure 2A:
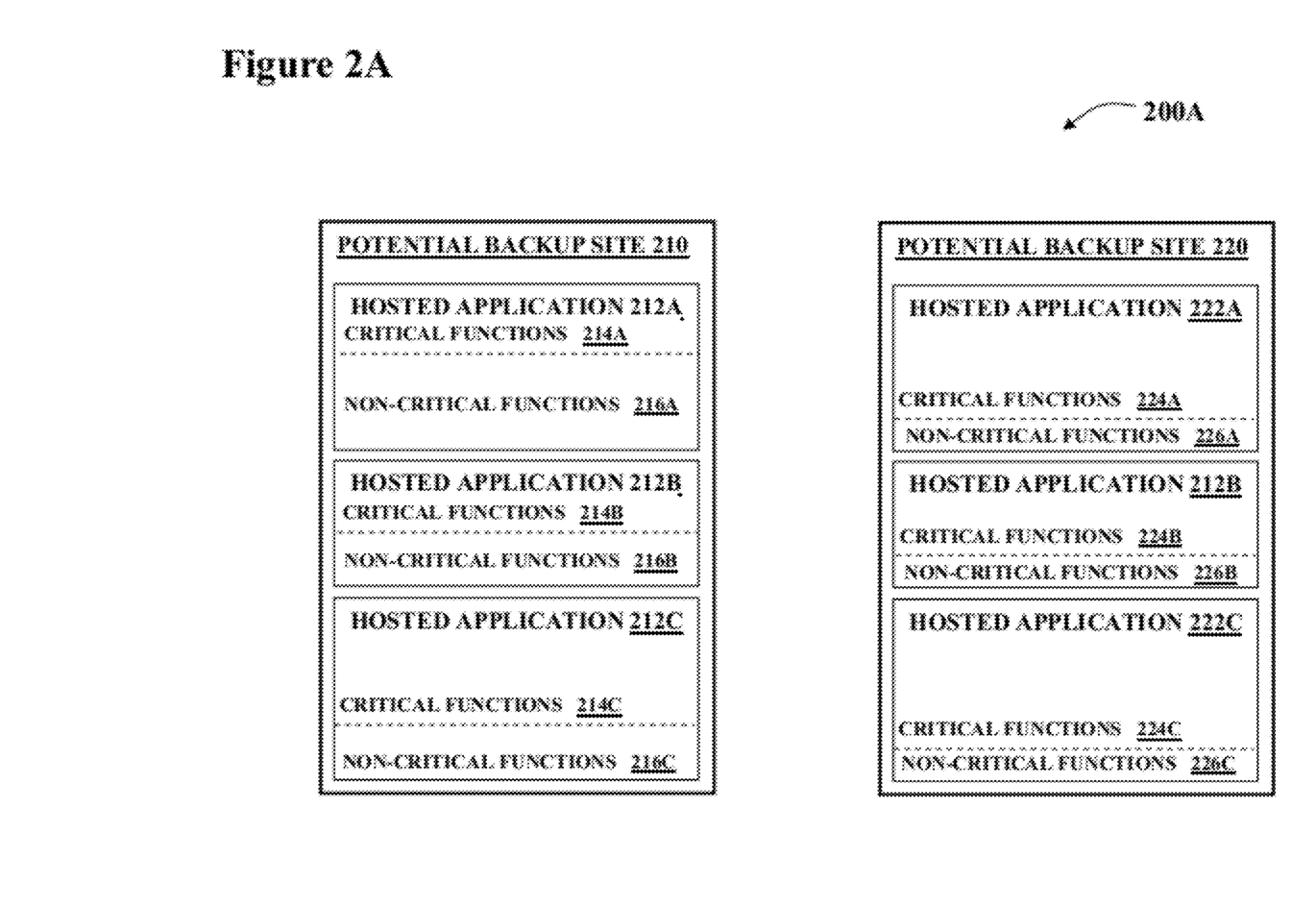
FIG. 2A shows two potential backup sites operating under a normal workload according to an embodiment of the invention.

Referring now to FIG. 2A, two potential backup sites 210, 220 are shown operating under a normal workload 200A. As shown, each potential backup site 210, 220 has a number of hosted applications, with potential backup site 210 having hosted applications 212A-C and potential backup site 220 having hosted applications 222A-C. It should be understood that although each of potential backup sites 210, 220 is illustrated in the figure as having three applications, either or both of potential backup sites 210, 220 could have a greater or lesser number of hosted applications. Further, although two potential backup sites 210, 220 are illustrated in the figure, it should be understood that any number of potential backup sites is envisioned.

In any case, each hosted application 212A-C, 222A-C can have critical functions 214A-C, 224A-C. These critical functions are actions performed by the associated application that have a priority that is relatively high. Further, each hosted application 212A-C, 222A-C can have non-critical functions 216A-C, 226A-C. These non-critical functions are actions performed by the associated application that have a lower priority, relative to the critical functions. Different hosted applications 212A-C, 222A-C can have differing distributions of critical and non-critical functions, with some applications having no or a relatively low amount of critical functions, other hosted applications having no or a relatively low amount of non-critical functions, and still other hosted applications having an equivalent or relatively similar number of critical and non-critical functions. As shown in FIG. 2A, hosted application 212A has a relatively small volume of critical functions 214A and a relatively large volume of non-critical functions 216A. Conversely, hosted application 222C has a relatively large volume of critical functions 224C and a relative small volume of non-critical functions 226C as indicated by a relatively large amount of space allocated to non-critical functions 216A-C, 226A-C within application 222C. Similarly, as illustrated in FIG. 2B, applications 222A-C hosted on one potential backup site 220 may have an overall greater ratio of critical functions 224A-C to non-critical functions 226A-C than another potential backup site 210.

Figure 2B:
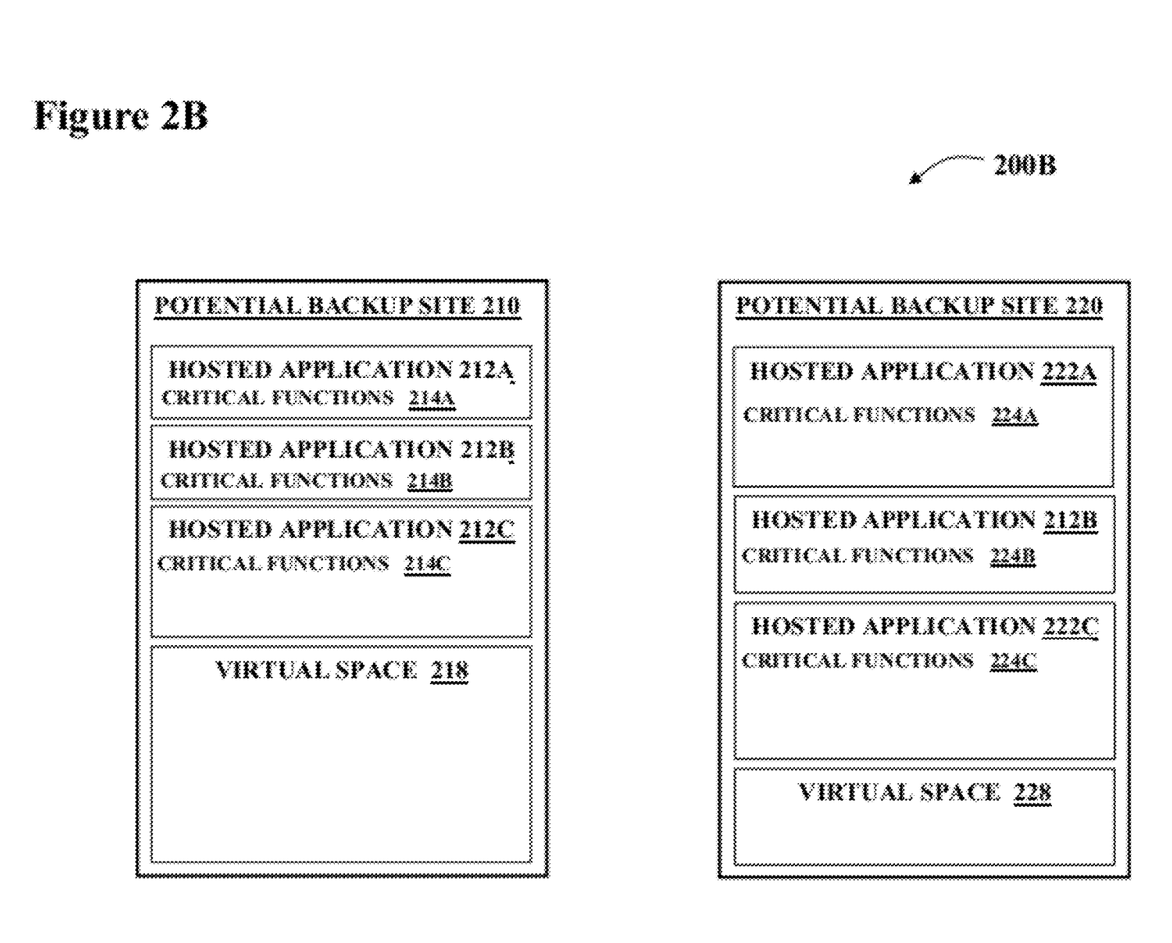
FIG. 2B shows two potential backup sites operating under a disaster recovery workload according to an embodiment of the invention.

Turning now to FIG. 2B, potential backup sites 210, 220 are shown operating under a disaster recovery workload 200B. As shown, hosted applications 212A-C, 222A-C have been deflated or crushed. Consequently, hosted applications 212A-C, 222A-C on potential sites 210, 220 are still executing critical functions 214A-C, 224A-C. However, all non-critical functions 216A-C, 226A-C (FIG. 2A) have been severely curtailed or, as illustrated, eliminated altogether. As a result, each potential backup site 210, 220 now has a virtual space 218, 228 made up of resources that had been utilized by non-critical functions 216A-C, 226A-C. While the deflation of FIG. 2B is shown as eliminating all non-critical functions 216A-C, 226A-C (FIG. 2A), it should be realized that other embodiments exist. For example, virtual space 218, 228 gained from deflating hosted applications 212A-C, 222A-C on potential sites 210, 220 could be achieved by deflating a mixture of critical functions 214A-C, 224A-C and non-critical functions 216A-C, 226A-C.

Referring now to FIGS. 1, 2A and 2B concurrently, backup site selection module 142 can select subscription backup site 190 for backup application 192 from among potential backup sites 210, 220 based on the resources contained in the corresponding virtual spaces 218, 228. Specifically, backup selection module 142 can select a subscription backup site 190 that has virtual space 194 that is able to accommodate the workload requirements for backup application 192.

In making this determination, backup site selection module 142 can measure operational characteristics (e.g., server utilization/performance data) 152 for application 182. These application operational characteristics 152 can include architecture requirements, CPU, Memory, IO, network bandwidth utilization metrics, and/or workload requirements, such as batch workload versus webserver workload or database server workload, for application 182, which can be measured automatically using tools that measure resources that are required for application 182 to operate normally. Additionally, site application requirements (backup site data) 154 for potential backup sites 210, 220 can be measured, including the site application requirements for each site under a normal workload 200A and a reduced disaster recovery workload 200B, that includes only critical processes. These measurements can be performed automatically using tools that measure resources utilized by critical functions 214A-C, 224A-C and non-critical functions 216A-C, 226A-C of hosted applications 212A-C, 222A-C on the potential backup sites 210, 220. Once these characteristics are measured, the amount of virtual space 218, 228 for each potential backup site 210, 220 can be calculated by taking the difference between the normal workload and the disaster recovery workload. The site application requirements and/or virtual space 218, 228 for each potential backup site 210, 220 can be stored, such as in storage system 118, and accessed by backup site selection module 142 to use in making the selection.

Figure 3:
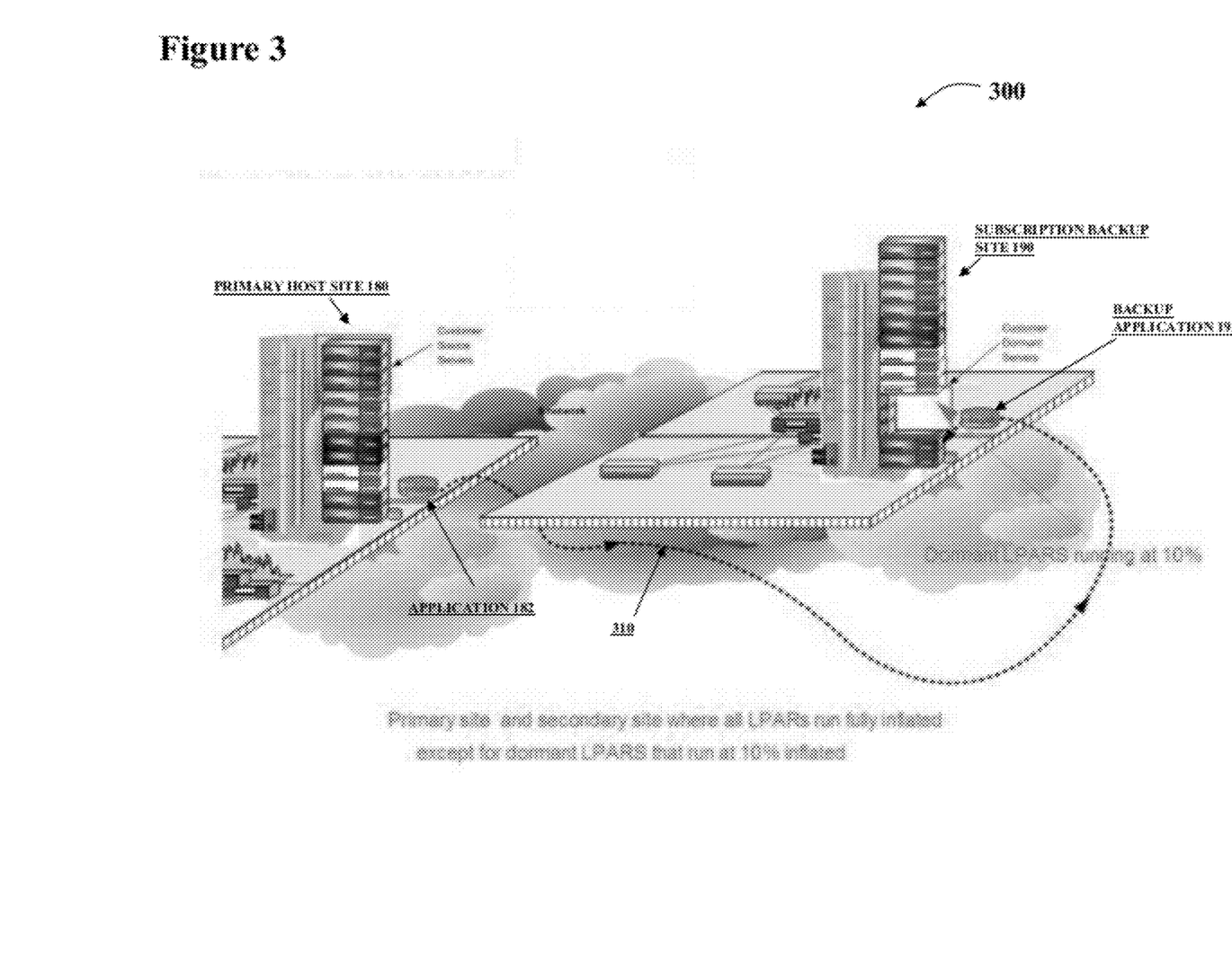
FIG. 3 shows an illustration of a deflated backup application on a subscription backup site according to an embodiment of the invention.

Turning now to FIGS. 1 and 3, concurrently, once subscription backup site 190 has been selected, backup application deflation module 144, as executed by computer system 102, can deflate a backup application 192 of application 182 on subscription backup site 190 under a normal workload 300. In doing so, application 182 is replicated to yield backup application 192. Backup application 192 is then migrated 310 to subscription backup site 190. Once on subscription backup site 190, backup application deflation module 144 places backup application 192 in a dormant state. However, unlike currently known dormant state backup solutions, only a small fraction of the resources required by the workload requirements to execute application 182 are allocated to backup application 192. In one embodiment, referenced in FIGS. 3-4, the resources can be logical partitions (LPARs) running in a virtual machine operating system, such as from IBM Corp. (IBM is a trademark of International Business Machines Corp. of Armonk, N.Y. in the United States and/or other countries. In this embodiment, a fully operational virtual machine can run in each LPAR The LPARs allocated at subscription backup site 190 to backup application 192 for disaster recovery can be deflated/dormant until a disaster is called in the primary site thereby keeping utilization and costs low.

As shown in FIG. 3, backup application 192 has been allocated 10% of its workload requirements, however, it should be realized that other scenarios exist in which the fraction could vary. In any case, only the minimum amount of resources are allocated to backup application 192 for performing basic functions, including such functions as receiving an instruction to activate and/or receiving and incorporating updates. In this manner, application 182 can be synchronized with backup application 192 to maintain currency of backup application 192 while backup application 192 is in its dormant state. This dormant state with its fractional resource allocation allows resources of subscription backup site 190 that would normally be tied up with backup application 192 to be allocated to other fully or partially functional hosted applications 196 of subscription backup site. During this normal workload 300 period, the monitoring tool can continue to monitor subscription backup site 190 to ensure that adequate virtual space 194 for executing backup application 192 is maintained. In the case that virtual space 194 becomes too low, actions can be taken to ensure that disaster recovery will be able to occur, including, but not limited to: moving backup application 192 to an alternate subscription backup site 190 that has the requisite amount of virtual space, moving other hosted applications 196 from subscription backup site 190 to alternate hosts, exchanging other hosted applications 196 on subscription backup site 190 with hosted applications on alternate hosts that are more easily crushable (e.g., have more non-critical functions), and/or reconfiguring the parameters for deflating other hosted applications 196 and/or for re-inflating backup application 192.

Figure 4:
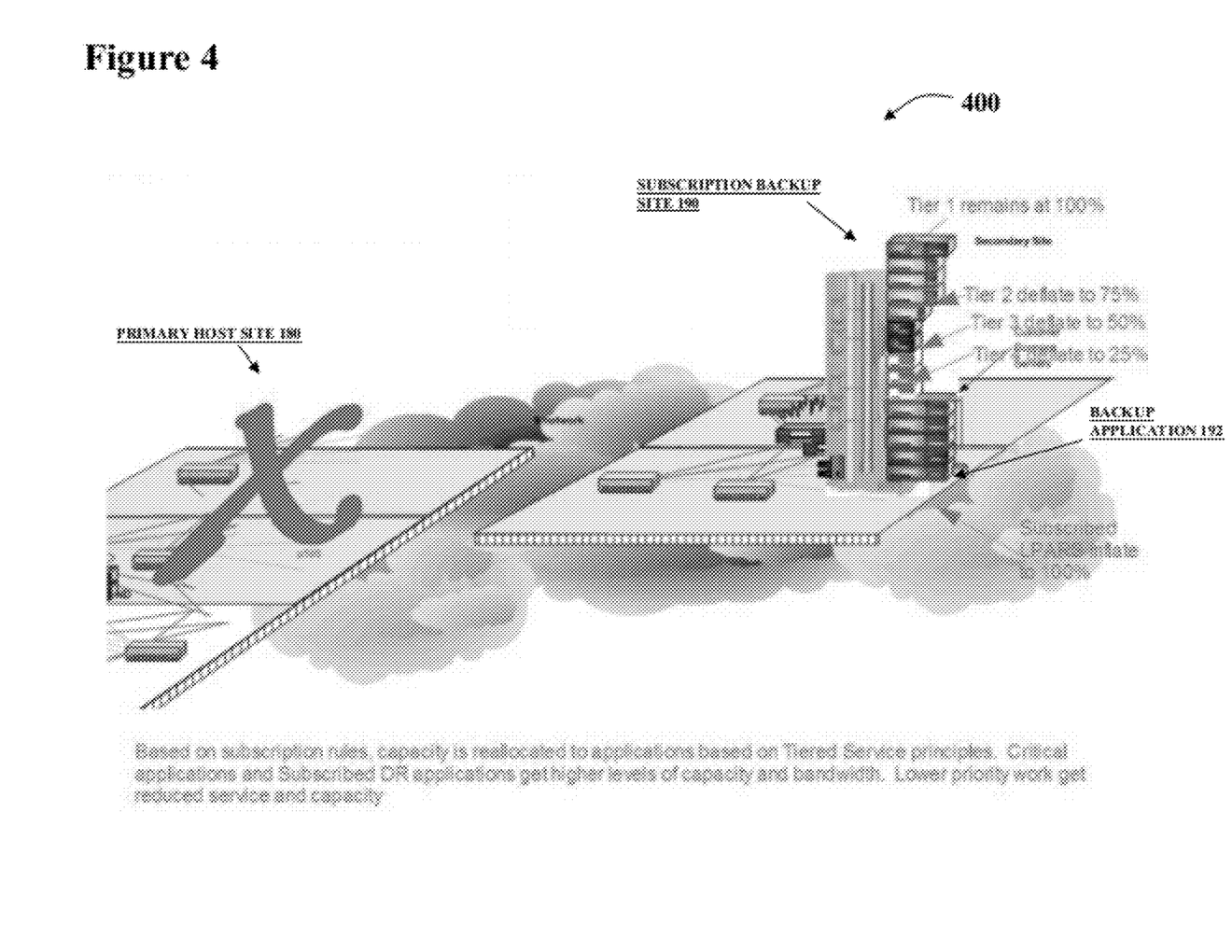
FIG. 4 shows an illustration of an inflated backup application on a subscription backup site during disaster recovery according to an embodiment of the invention.

Turning now to FIGS. 1 and 4, concurrently, backup application reinflation module 146, as executed by computer system 102, can respond to a disaster 400 on primary host site 180. To do so, backup application reinflation module 146 re-inflates backup application 192 on subscription backup site 190. This re-inflation allocates the resources necessary to enable backup application 192 to execute on subscription backup site 190. To obtain the resources to allocate to the inflated backup application 192, backup application reinflation module 146 can initiate a disaster recovery workload, such as was described in conjunction with FIG. 2B. As previously described, other hosted applications 196 on subscription backup site 190 can be deflated to create virtual space 194.

As illustrated in FIG. 4, this deflating can be multi-tiered, in which some hosted applications 196 can remain at their full resource allocation, while other hosted applications 196 can be reduced by varying percentages, based on the service level agreements associated with the particular hosted applications 196. In other embodiments, an incremental approach can be used to generate the necessary virtual space 194. In such an approach, subscription backup site 190 could first pool any unused capacity from its constituent members. If more virtual space 194 is needed, non-critical workload can be forced to use only entitled capacity in order to provide excess capacity to critical workload and backup application 192. If still more virtual space 194 is needed and/or if critical and non-critical workloads begin competing for entitled capacity, the non-critical workload can be deflated (e.g., its entitlement reduced or eliminated) and the remaining capacity reallocated into a pool for critical and backup application 192 to fully inflate.

In any case, resources from virtual space 194 created by the deflation of other hosted applications 196 on subscription backup site 190 are allocated to backup application 192, allowing backup application 192 to execute on subscription backup site 190. In so enabling, backup application inflation module 146 can restore the full compliment of resources that enable backup application 192 to be fully functional. On the other hand, backup application inflation module 146 can restore a reduced set of resources that enables backup application 192 to perform only critical tasks or critical tasks and a reduced level of non-critical tasks. In any case, backup application 192 remains accessible to users 120 from subscription backup site 190 until such time as primary host site 180 is restored or other arrangements are made for hosting of application 182, with the result that users 120 of application 182 can have only a brief interruption of service, while users 120 of hosted applications 196 can maintain service, only at a slightly diminished level. Furthermore, more resources are available during normal, non-disaster recovery, operations due to the fractional resource allocation of the deflated backup application 192.

While shown and described herein as a method and system for implementing disaster recovery for an application 182, it is understood that aspects of the invention further provide various alternative embodiments. For example, in one embodiment, the invention provides a computer program fixed in at least one computer-readable medium, which when executed, enables a computer system to implement disaster recovery for an application 182. To this extent, the computer-readable medium includes program code, such as disaster recovery implementation program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as disaster recovery implementation program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for implementing disaster recovery for an application 182. In this case, a computer system, such as computer system 12 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for implementing disaster recovery for an application, comprising:
   selecting a subscription backup site for the application from a plurality of sites, the subscription backup site being a primary host site for a separate set of applications and having a virtual space that is able to accommodate the workload requirements for the application;
   deflating the application to operate in a dormant state having a small fraction of resources allocated with respect to the workload requirements for the application, wherein the dormant state allows resources to be shared between the application and the separate set of applications, and the small fraction of resources is greater than zero; and
   in response to a disaster on a primary site of the application:
   pooling resources from a plurality of constituents of the subscription backup site to create resources for the application;
   reducing a resource entitlement of the separate set of applications to increase the created resources for the application in response to an insufficiency of the pooled resources, wherein the reducing includes reducing a non-critical workload of the separate set of applications before a reducing a critical workload of the separate set of applications; and
   inflating the application on the subscription backup site by allocating the created resources to enable the application to execute on the subscription backup site.

2. The method of claim 1, wherein the selecting comprises:
   measuring application operational characteristics for the application, the application operational characteristics including an architecture and workload requirements for the application;
   measuring site application requirements for the plurality of sites, the site application requirements for each site including a normal workload and a disaster recovery workload, the disaster recovery workload being a reduced workload that includes only critical processes; and
   calculating a virtual space for each site, the virtual space indicating a difference between the normal workload and the disaster recovery workload.

3. The method of claim 2, wherein the measuring of at least one of the application operational characteristics or the site application requirements is performed automatically using a measuring tool.

4. The method of claim 2, the selecting further comprising:
   storing data regarding the application requirements and the virtual space for each of the plurality of sites in a database; and
   importing the data prior to the selecting.

5. The method of claim 1, further comprising replicating the application to the subscription backup site, prior to the deflating.

6. The method of claim 1, wherein the deflating allocates to the backup application only a minimum amount of resources necessary for performing basic functions, and the basic functions include one of receiving an instruction to inflate, receiving updates, or incorporating updates.

7. A system for implementing disaster recovery for an application, comprising:
   a processor as part of a computer infrastructure that provides:
   a backup site selection component that selects a subscription backup site for the application from a plurality of sites, the subscription backup site being a primary host site for a separate set of applications and having a virtual space that is able to accommodate the workload requirements for the application;
   a backup application deflation component that deflates the application to operate in a dormant state having a small fraction of resources allocated with respect to the workload requirements for the application, wherein the dormant state allows resources to be shared between the application and the separate set of applications, and the small fraction of resources is greater than zero; and
   a backup application reinflation component that, in response to a disaster on a primary site of the application:
   pools resources from a plurality of constituents of the subscription backup site to create resources for the application;

reduces a resource entitlement of the separate set of applications to increase the created resources for the application in response to an insufficiency of the pooled resources, wherein the reducing includes reducing a non-critical workload of the separate set of applications before reducing a critical workload of the separate set of applications; and inflates the application on the subscription backup site by allocating the created resources to enable the application to execute on the subscription backup site in response to a disaster on a primary site of the application.

8. The system of claim 7, wherein the backup site selection module further:

measures application operational characteristics for the application, the application operational characteristics including an architecture and workload requirements for the application;

measures site application requirements for the plurality of sites, the site application requirements for each site including a normal workload and a disaster recovery workload, the disaster recovery workload being a reduced workload that includes only critical processes; and calculates a virtual space for each site, the virtual space indicating a difference between the normal workload and the disaster recovery workload.

9. The system of claim 8, wherein the measuring of at least one of the application operational characteristics or the site application requirements is performed automatically using a measuring tool.

10. The system of claim 8, wherein the backup site selection module further:

stores data regarding the application requirements and the virtual space for each of the plurality of sites in a database; and imports the data prior to the selecting.

11. The system of claim 7, wherein the backup application deflation module further replicates the application to the subscription backup site, prior to the deflating.

12. The system of claim 7, wherein the backup application deflation module further allocates to the backup application only a minimum amount of resources necessary for performing basic functions, and the basic functions include one of receiving an instruction to inflate, receiving updates, or incorporating updates.

13. A computer program product embodied in a non-transitory computer readable storage medium for implementing a method for implementing disaster recovery for an application, the method comprising:

selecting a subscription backup site for the application from a plurality of sites, the subscription backup site being a primary host site for a separate set of applications and having a virtual space that is able to accommodate the workload requirements for the application;

deflating the application to operate in a dormant state having a small fraction of resources allocated with respect to the workload requirements for the application, wherein the dormant state allows resources to be shared between the application and the separate set of applications, and the small fraction of resources is greater than zero; and in response to a disaster on a primary site of the application:

pooling resources from a plurality of constituents of the subscription backup site to create resources for the application;

reducing a resource entitlement of the separate set of applications to increase the created resources for the application in response to an insufficiency of the pooled resources, wherein the reducing includes reducing a non-critical workload of the separate set of applications before reducing a critical workload of the separate set of applications; and inflating the application on the subscription backup site by allocating the created resources to enable the application to execute on the subscription backup site in response to a disaster on a primary site of the application.

14. The computer program product of claim 13, wherein the selecting comprises:

measuring application operational characteristics for the application, the application operational characteristics including an architecture and workload requirements for the application;

measuring site application requirements for the plurality of sites, the site application requirements for each site including a normal workload and a disaster recovery workload, the disaster recovery workload being a reduced workload that includes only critical processes; and calculating a virtual space for each site, the virtual space indicating a difference between the normal workload and the disaster recovery workload.

15. The computer program product of claim 14, wherein the measuring of at least one of the application operational characteristics or the site application requirements is performed automatically using a measuring tool.

16. The computer program product of claim 14, the method further comprising:

storing data regarding the application requirements and the virtual space for each of the plurality of sites in a database; and importing the data prior to the selecting.

17. The computer program product of claim 13, the method further comprising:

initiating a disaster recovery workload on the subscription backup site to create the virtual space, the disaster recovery workload being a reduced workload that includes only critical processes; and assigning the virtual space as the resources for allocation to the backup application.

18. The computer program product of claim 13, the method further comprising replicating the application to the subscription backup site, prior to the deflating.

19. A method for deploying an application for implementing disaster recovery for an application, comprising:

providing a computer infrastructure being operable to:

select a subscription backup site for the application from a plurality of sites, the subscription backup site being a primary host site for a separate set of applications and having a virtual space that is able to accommodate the workload requirements for the application;

deflate the application to operate in a dormant state having a small fraction of resources allocated with respect to the workload requirements for the application, wherein the dormant state allows resources to be shared between the application and the separate set of applications, and the small fraction of resources is greater than zero; and in response to a disaster on a primary site of the application:

pooling resources from a plurality of constituents of the subscription backup site to create resources for the application;

reducing a resource entitlement of the separate set of applications to increase the created resources for the application in response to an insufficiency of the pooled resources, wherein the reducing includes reducing a non-critical workload of the separate set of applications before a reducing a critical workload of the separate set of applications; and inflate the application on the subscription backup site by allocating resources to enable the application to execute on the subscription backup site.

20. The method of claim 1, wherein the reducing of the resource entitlement of the separate set of applications further includes eliminating the resource entitlement of an application in the separate set of applications.

21. The computer program product of claim 13, wherein the reducing of the resource entitlement of the separate set of applications causes a first portion of the set of applications to continue at a full resource allocation, and a second portion of the separate set of applications to continue at a reduced resource allocation.

\* \* \* \* \*